(12) United States Patent
Uemura et al.

(10) Patent No.: US 11,486,420 B2
(45) Date of Patent: Nov. 1, 2022

(54) ELECTRIC WORK VEHICLE

(71) Applicant: Kubota Corporation, Osaka (JP)

(72) Inventors: Katsuhiko Uemura, Sakai (JP);
Hirokazu Ito, Sakai (JP); Yasuhiro Manji, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 434 days.

(21) Appl. No.: 16/677,400

(22) Filed: Nov. 7, 2019

(65) Prior Publication Data

US 2020/0208657 A1  Jul. 2, 2020

(30) Foreign Application Priority Data

Dec. 26, 2018  (JP) .............................. JP2018-243332
Dec. 26, 2018  (JP) .............................. JP2018-243333

(51) Int. Cl.
| | |
|---|---|
| *H02K 9/19* | (2006.01) |
| *F15B 21/0427* | (2019.01) |
| *B60L 50/60* | (2019.01) |
| *A01D 34/74* | (2006.01) |
| *A01D 34/78* | (2006.01) |
| *B60L 1/00* | (2006.01) |
| *F15B 13/08* | (2006.01) |

(Continued)

(52) U.S. Cl.
CPC .......... *F15B 21/0427* (2019.01); *A01D 34/74* (2013.01); *A01D 34/78* (2013.01); *B60L 1/003* (2013.01); *B60L 50/60* (2019.02); *F15B 13/08* (2013.01); *H02K 9/19* (2013.01); *H02K 11/0094* (2013.01); *A01D 34/66* (2013.01);
*A01D 2101/00* (2013.01); *B60L 2200/40* (2013.01); *B60L 2240/425* (2013.01)

(58) Field of Classification Search
CPC ...... F15B 21/0427; F15B 13/08; B60L 50/60; B60L 1/003; B60L 2200/40; B60L 2200/425; B60L 2240/425; A01D 34/74; A01D 34/78; A01D 34/66; A01D 2101/00; H02K 9/19; H02K 11/0094
USPC ...................................................... 180/65.1
See application file for complete search history.

(56) References Cited

U.S. PATENT DOCUMENTS

| 8,357,073 B2 * | 1/2013 | Iwase ................. B60W 30/194 |
|---|---|---|
| | | 475/5 |
| 2015/0032314 A1 * | 1/2015 | Kitamura ............. B60W 20/10 |
| | | 180/65.28 |

(Continued)

FOREIGN PATENT DOCUMENTS

| EP | 1985487 A2 | 10/2008 |
|---|---|---|
| JP | 4145801 A | 5/1992 |

(Continued)

*Primary Examiner* — John D Walters
*Assistant Examiner* — Hilary L Johns
(74) *Attorney, Agent, or Firm* — The Webb Law Firm

(57) ABSTRACT

Provided is an electric work vehicle having a simple configuration, yet allowing a hydraulic cylinder to function appropriately even in a low-temperature environment. An electric work vehicle includes a first hydraulic cylinder, a second hydraulic cylinder and a third hydraulic cylinder and includes also a hydraulic system for feeding work oil to these hydraulic cylinders and a traveling motor. The hydraulic system includes an oil heating circuit for heating the work oil using heat generated from the traveling motor.

10 Claims, 6 Drawing Sheets

(51) Int. Cl.
*H02K 11/00* (2016.01)
*A01D 34/66* (2006.01)
*A01D 101/00* (2006.01)

(56) References Cited

U.S. PATENT DOCUMENTS

| | | | | |
|---|---|---|---|---|
| 2018/0251957 A1* | 9/2018 | Hyodo | .................... | F02D 23/00 |
| 2018/0303027 A1* | 10/2018 | Koike | .................... | B62D 11/04 |

FOREIGN PATENT DOCUMENTS

| | | | | |
|---|---|---|---|---|
| JP | H1182427 | A | | 3/1999 |
| JP | 2002174328 | A | | 6/2002 |
| JP | 2002227998 | A | | 8/2002 |
| JP | 2002340167 | A | | 11/2002 |
| JP | 2007202486 | A | | 8/2007 |
| JP | 2011208711 | A | | 10/2011 |
| JP | 2013147825 | A | * | 8/2013 |
| JP | 2013147825 | A | | 8/2013 |
| JP | 20147780 | A | | 1/2014 |
| JP | 201724710 | A | | 2/2017 |
| JP | 2018182924 | A | | 11/2018 |
| JP | 2018184035 | A | | 11/2018 |
| KR | 1020150124451 | A | | 11/2015 |

\* cited by examiner

ELECTRIC WORK VEHICLE

CROSS-REFERENCE TO RELATED APPLICATIONS

This application claims priority to Japanese Patent Application No. 2018-243332 and 2018-243333, filed Dec. 26, 2018, the disclosures of which are hereby incorporated by reference in their entirety.

TECHNICAL FIELD

The present invention relates to an electric work vehicle having a hydraulic cylinder and an electric motor.

BACKGROUND ART

For instance, Patent Document 1 discloses a tractor having a hydraulic cylinder and an electric motor. The hydraulic cylinder lifts up/down a utility implement (a rotary plow for cultivating a field, etc.). The electric motor drives a traveling device.

BACKGROUND ART DOCUMENT

Patent Document

Patent Document 1: Japanese Unexamined Patent Application Publication No. 2017-24710

SUMMARY OF THE INVENTION

Problem to be Solved by Invention

It is required for a work oil to be supplied to a hydraulic cylinder to have an appropriate viscosity. Under a low-temperature environment, the viscosity of work oil becomes higher, thus leading to possibility of the hydraulic cylinder not functioning appropriately. In order to heat the work oil, it is conceivable to provide a heater or the like which generates heat with supply of electric power thereto. However, as this increases the number of components constituting the electric work vehicle, such measure is undesirable.

In view of the above-described state of the art, an object of the present invention is to provide an electric work vehicle having a simple configuration, yet allowing a hydraulic cylinder to function appropriately even in a low-temperature environment.

Further, with an electric motor, heat is generated with functioning thereof and the temperature rises. In particular, in the case of a compact high-output motor, as its amount of heat generation is large and its surface area is small, there will develop a high temperature. In order to suppress occurrence of such trouble as output reduction due to excessive temperature rise, it is conceivable to provide a water cooling circuit for cooling the electric motor through heat exchange with cooling water. However, if both a hydraulic circuit for feeding work oil to the hydraulic cylinder and a water cooling circuit are provided, this is undesirable as it increases the number of components and complicates the configuration as well.

In view of the above-described state of the art, a further object of the present invention is to provide an electric work vehicle that allows an electric motor to function in a reliable manner through cooling of the electric motor by a simple arrangement.

Solutions

An electric work vehicle according to the present invention comprises:
a hydraulic cylinder;
a work oil feeding section for feeding work oil to the hydraulic cylinder; and
an electric motor;
wherein the work oil feeding section includes a heating section for heating the work oil with using heat generated from the electric motor.

With the above-described arrangement, the work oil is heated by using heat generated from the electric motor and the temperature of the work oil is set to an appropriate temperature thereby. Thus, with such simple arrangement, the viscosity of the work oil can be made appropriate even in a low-temperature environment, so the hydraulic cylinder is allowed to function in a reliable manner.

Preferably, in the present invention, the electric work vehicle further comprises a control section for effecting an oil temperature adjustment operation for heating the work oil by controlling the work oil feeding section, the control section effecting the oil temperature adjustment operation in response to an operation received by a manual operational tool.

With the above-described arrangement, a driver of the electric work vehicle can cause the oil temperature adjustment operation by operating the manual operational tool. So, depending on the need such as the situation of the environment temperature being low, etc., by heating the work oil, it is possible to allow the hydraulic cylinder to function reliably.

Preferably, in the present invention, the electric work vehicle further comprises a control section for effecting an oil temperature adjustment operation for heating the work oil by controlling the work oil feeding section, the control section effecting the oil temperature adjustment operation in accordance with a temperature of the work oil detected by a temperature sensor.

With the above-described arrangement, the work oil can be heated appropriately in accordance with a temperature of the work oil detected by a temperature sensor, so the hydraulic cylinder can be operated reliably.

Preferably, in the present invention, the electric work vehicle further comprises a reporting mechanism that effects reporting in accordance with a temperature of the work oil detected by the temperature sensor.

With the above-described arrangement, via reporting, the driver can grasp the condition of the work oil, so the driver can take an appropriate measure according to the reporting.

Preferably, in the present invention, the electric work vehicle further comprises:
a control section for effecting an oil temperature adjustment operation for heating the work oil by controlling the work oil feeding section;
a battery for feeding electric power to the electric motor; and
the control section effecting the oil temperature adjustment operation during charging of the battery.

In case an excess amount of electric power is consumed by the oil temperature adjustment operation, the working period of the electric work vehicle by the battery is reduced disadvantageously. With the above-described arrangement, since the oil temperature adjustment operation is effected during charging of the battery, a sufficient amount of electric power will be stored in the battery, so that reduction in the working period of the electric work vehicle can be suppressed advantageously.

Preferably, in the present invention, the electric work vehicle further comprises a work motor for driving an implement as the electric motor.

With the above-described arrangement, the work oil can be heated by using heat generated from the work motor that drives an implement.

Preferably, in the present invention, the electric work vehicle further comprises:

a control section for effecting an oil temperature adjustment operation for heating the work oil by controlling the work oil feeding section;

a traveling motor for driving a traveling device as the electric motor;

a power feeding section for feeding electric power to the traveling motor; and the control section causing the power feeding section to feed electric power to the traveling motor when the oil temperature adjustment operation is effected.

With the above-described arrangement, by feeding electric power from then power feeding section to the traveling motor and using heat generated from this traveling motor, the work oil can be heated. For instance, it is also possible to feed the traveling motor with such a small amount of electric power that does not operate the traveling device to cause the traveling motor to generate heat, so that heating of the work oil is effected without causing the electric work vehicle to travel.

Preferably, in the present invention, the electric work vehicle further comprises a braking mechanism to brake the traveling device, the control section causing the power feeding section to feed electric power to the traveling motor with keeping an operation of the braking mechanism, when the oil temperature adjustment operation is effected.

With the above-described arrangement, by feeding electric power to the traveling motor with allowing a braking operation by the braking mechanism to take place, the work oil can be heated by using heat generated from the traveling motor. For instance, it is also possible to effect heating of the work oil while the electric work vehicle is kept under a stopped state or under a moving state at a predetermined speed by the braking mechanism.

An electric work vehicle according to the present invention comprises:

a hydraulic cylinder;

a work oil feeding section for feeding work oil to the hydraulic cylinder;

an electric motor; and a cooling section for cooling the electric motor by using the work oil fed from the work oil feeding section.

With the above-described arrangement, by cooling the electric motor with using the work oil fed from the work oil feeding section, the temperature of the electric motor can be set to an appropriate temperature. Thus, through a simple arrangement, the electric motor can be cooled, so that the electric motor can function reliably.

Preferably, in the present invention, the electric work vehicle further comprises:

a control section for controlling the work oil feeding section;

the work oil feeding section having a pump for pumping out the work oil to the cooling section; and the control section controlling the pump in accordance with a temperature of the electric motor detected by a temperature sensor.

With the above-described arrangement, as the pump is controlled according to the temperature of the electric motor, temperature rise of the electric motor can be suppressed, so that the electric motor can function in an even more reliable manner.

Preferably, in the present invention, a traveling motor for driving a traveling device is provided as the electric motor.

With the above-described arrangement, the traveling motor can be cooled with using the work oil fed from the work oil feeding section.

Preferably, in the present invention, a work motor for driving an implement is provided as the electric motor.

With the above-described arrangement, the work motor can be cooled with using the work oil fed from the work oil feeding section.

EMBODIMENTS

First Embodiment

Next, an embodiment as an example of the present invention will be explained with reference to the accompanying drawings. Incidentally, in the following explanation, in connection with a vehicle body of a riding grass mower machine (an example of an "electric work vehicle"), the direction of arrow F shown in FIG. 1 is defined as "vehicle body front side", the direction of arrow B is defined as "vehicle body rear side", the direction of arrow U shown in FIG. 1 is defined as "vehicle body upper side", the direction of arrow D is defined as "vehicle body lower side", the direction of arrow L shown in FIG. 2 is defined as "vehicle body left side" and direction of arrow R is defined as "vehicle body right side", respectively.

[General Configuration of Riding Grass Mower Machine]

Figure 1:
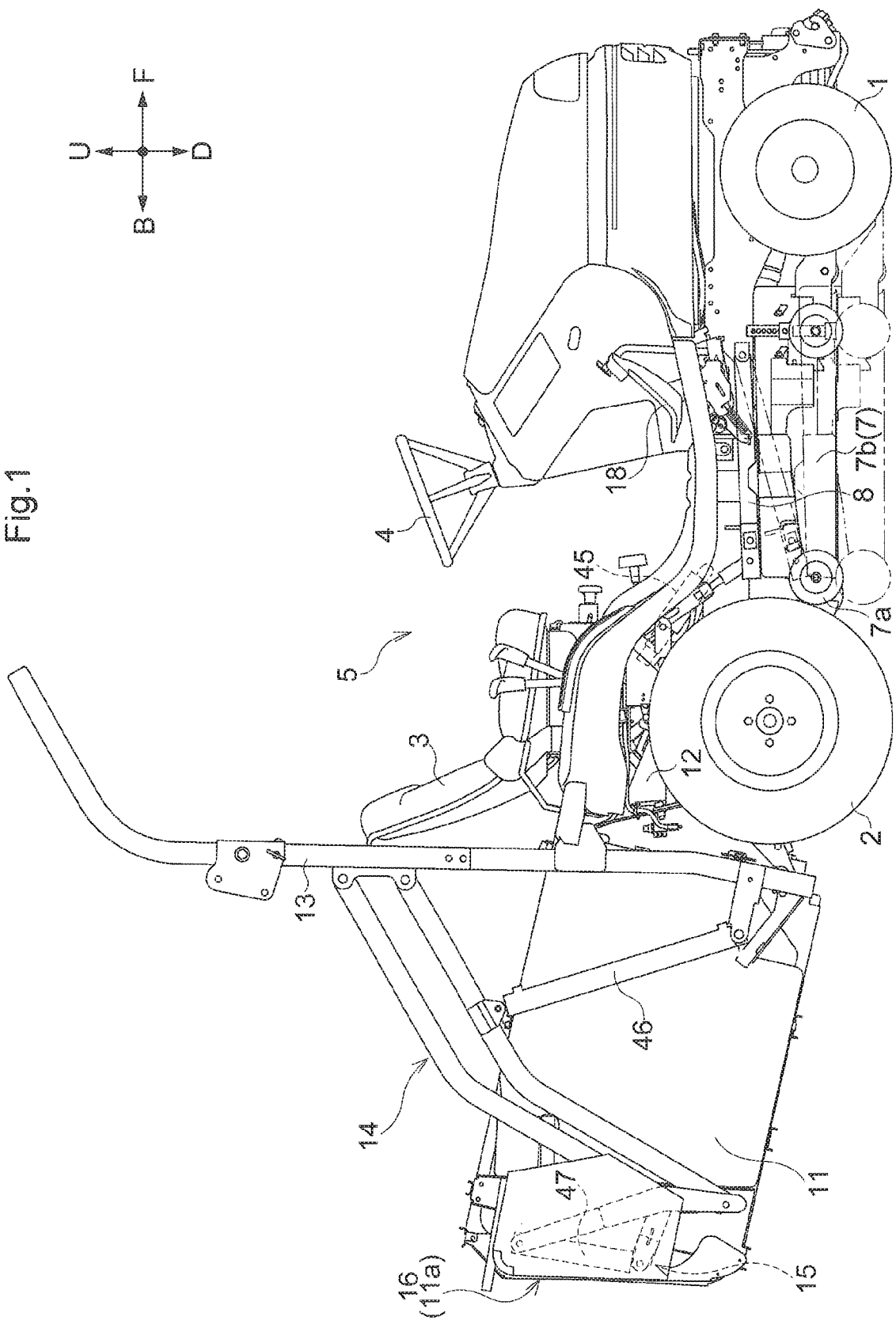
FIG. 1 is a right side view showing a riding type grass mower machine in its entirety according to a first embodiment.
Figure 2:
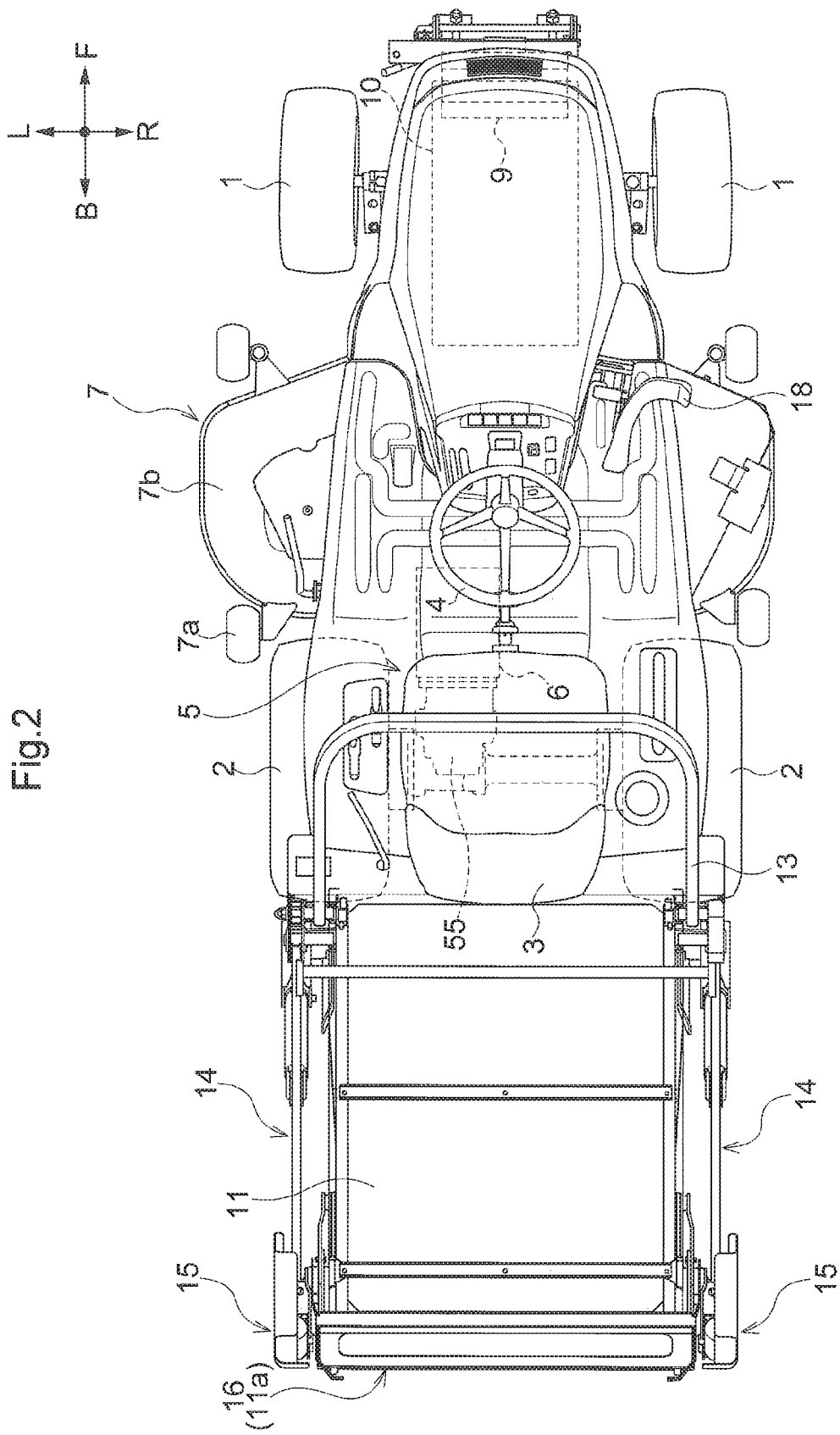
FIG. 2 is a plain view showing the riding type grass mower machine in its entirety according to the first embodiment.

As shown in FIGS. 1 and 2, the riding grass mower machine includes a riding type vehicle body mounting a pair of left and right front wheels 1 mounted to be pivotally steerable, a pair of left and right rear wheels 2 as a traveling device mounted to be drivable, and a driving section 5 having a driver's seat 3 and a steering wheel 4 for steering the front wheels 1. Under the driver's seat 3, there is provided a traveling motor 6 (an example of an "electric motor") as an electric motor for driving the left and right rear wheels 2.

Between the front wheels 1 and the rear wheels 2, there is provided a mower device 7 for cutting grass/lawn. This mower device 7 is supported to the vehicle body via a link mechanism 8 which in turn is supported to the vehicle body to be pivotally lifted up/down. In response to a lifting up/down operation of the link mechanism 8, the mower device 7 will be lifted up/down between a lowered work state in which a gauge wheel 7a is placed on the ground surface and an elevated non-work state in which the gauge wheel 7a is lifted up off the ground surface. At a portion of the vehicle body on more front side than the mower device 7, there is provided a work motor 9 (an example of the "electric motor") as an electric motor for driving the mower device 7. At a portion of the vehicle body on more front side than the steering wheel 4, there is provided a battery 10 that feeds electric power to the traveling motor 6 and the work motor 9.

To a rear portion of the vehicle body, a grass collecting container 11 is connected. And, a conveying duct 12 is provided between a cut grass discharging portion of the mower device 7 and a cut grass inlet of the grass collecting container 11. The conveying duct 12 is disposed to extend through between the left rear wheel 2 and the right rear wheel 2 under the vehicle body. In this mower device 7, grass/lawn cutting operation by rotary blades (not shown) provided inside a cutter blade housing 7b is carried out. Cut grass/lawn pieces (cut grass pieces and cut lawn pieces will be referred to collectively as "cut grass" in the following discussion) are sent into the conveying duct 12 by a conveying air current generated in association with rotation of the cutter blades and conveyed through this conveying duct 12 to the grass collecting container 11 to be stored in this grass collecting container 11.

As shown in FIG. 1, a pair of vertically pivotable lift link mechanisms 14 extend to the vehicle body rear side from a support frame 13 vertically mounted to a vehicle body rear portion to opposed lateral side of the grass collecting container 11. And, the grass collecting container 11 is supported to extension ends of the pair of left and right lift link mechanisms 14 via a pair of left and right pivot link mechanisms 15. At a rear portion of the grass collecting container 11, there are provided a discharge outlet 11a and a lid member 16 for opening/closing the discharge outlet 11a. The lid member 16 is supported to the grass collecting container 11 to be pivotable about a pivot axis oriented along the vehicle body transverse direction.

In response to a pivotal lifting up/down of the pair of left and right lift link mechanisms 14, the grass collecting container 11 is lifted up/down between a lowered reserving posture in which the cut grass inlet is communicated to the conveying duct 112 and an elevated posture in which the cut grass inlet is lifted up away from the conveying duct 12. Further, in response to a pivotal movement of the pair of left and right pivot link mechanisms 14, the grass collecting container 11 will be pivotally operated between an elevated posture and a discharging posture. The elevated posture is a posture in which the discharge outlet 11a of the grass collecting container 11 is oriented downwards and the lid member 16 is closed. By elevating the grass collecting container 11 into the elevated posture and pivotally operating it into the discharging posture, cut grass pieces reserved in the grass collecting container 11 will be discharged by gravity falling from the discharge outlet 11a.

[Arrangements for Operating Mower Device and Grass Collecting Container]

As shown in FIG. 1 and FIG. 2, a first hydraulic cylinder 45 is connected to the link mechanism 8 of the mower device 7. By lifting up/down the link mechanism 8 by an extension/contraction operation of the first hydraulic cylinder 45, the mower device 7 is lifted up/down between the lowered work state and the elevated non-work state.

As shown in FIG. 1 and FIG. 2, second hydraulic cylinders 46 are connected to the respective lift link mechanisms 14 on the opposed lateral sides of the grass collecting container 11. By lifting up the respective left/right lift link mechanisms 14 by extending/contracting the respective second hydraulic cylinders 46, the grass collecting container 11 is lifted up/down between the lowered reserving posture and the elevated posture.

As shown in FIG. 1 and FIG. 2, third hydraulic cylinders 47 are connected to the respectively pivot link mechanisms 15 on the opposed lateral sides of the grass collecting container 11. By lifting up the respective left/right pivot link mechanisms 15 by extending/contracting the respective third hydraulic cylinders 47, the grass collecting container 11 is lifted up/down between the elevated posture and the discharging posture.

[Hydraulic System]

Figure 3:
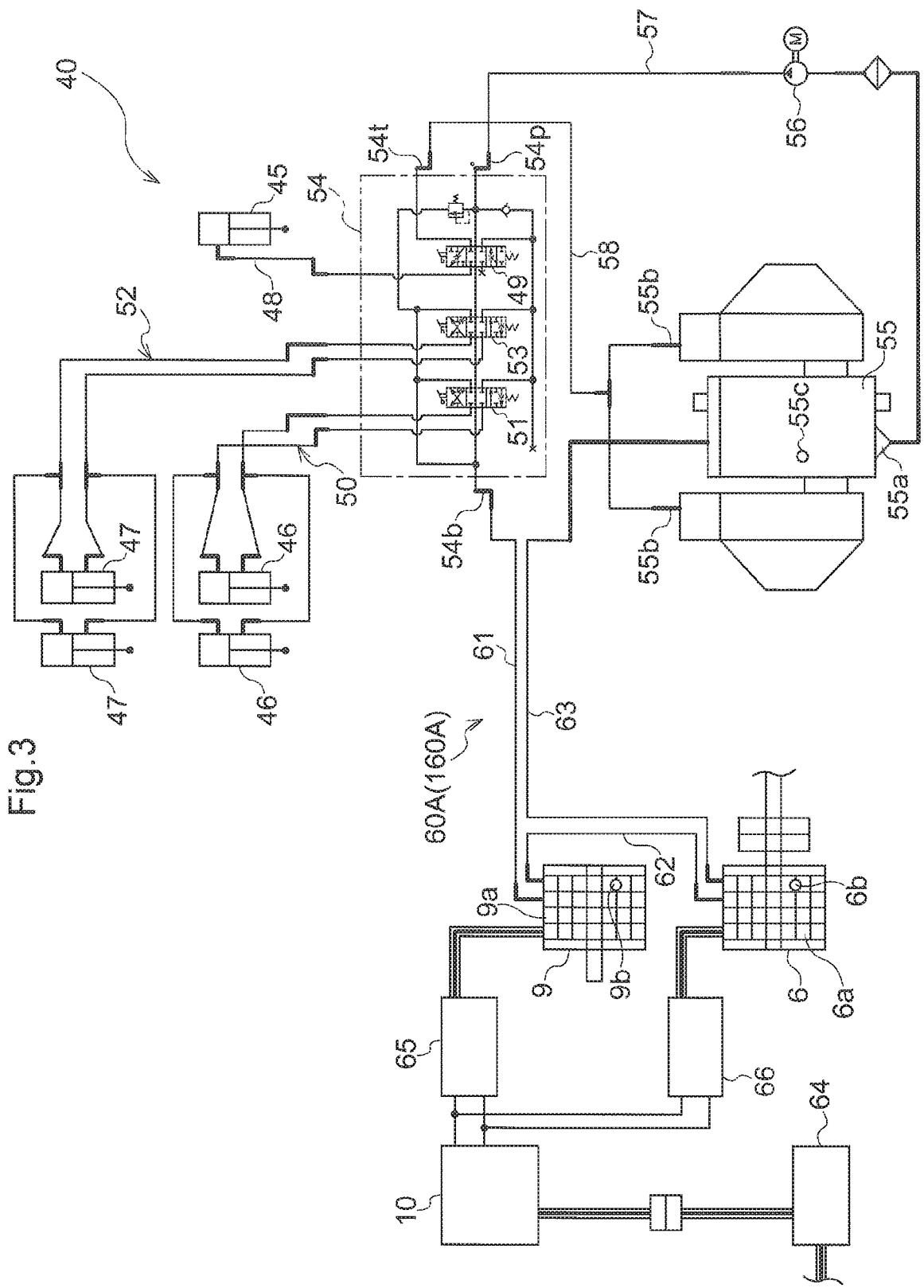
FIG. 3 is a circuit diagram showing a hydraulic system of the riding type grass mower machine according to the first embodiment.

The riding grass mower machine relating to this embodiment includes a hydraulic system 40 shown in FIG. 3 (an example of a "work oil feeding section"). This hydraulic system 40 feeds work oil to the first hydraulic cylinder 45, the second hydraulic cylinders 46 and the third hydraulic cylinders 47. The first hydraulic cylinder 45, the second hydraulic cylinders 46 and the third hydraulic cylinders 47 respectively are an example of "hydraulic cylinder".

The hydraulic system 40 includes an operational valve device 54. This operational valve device 54 includes a first operational valve 49, a second operational valve 51 and a third operational valve 53. The first operational valve 49 is connected to the first hydraulic cylinder 45 via an operational circuit 48. The second operational valve 51 is connected to the left and right second hydraulic cylinders 46 via an operational circuit 50. The third operational valve 53 is connected to the left and right hydraulic cylinders 47 via an operational circuit 52.

A pump port 54p of the operational valve device 54 and an oil outlet 55a of a transmission case 55 are connected to each other via an oil feeding passage 57 incorporating a hydraulic pump 56. The transmission case 55 houses therein a transmission (not shown) for transmitting power of the traveling motor 6 to the left and right rear wheels 2. A tank port 54t of the operational valve device 54 and an oil return portion 55b of the transmission case 55 are connected to each other via an oil discharge passage 58.

An amount of lubricant oil reserved in the transmission case 55 is fed to the operational valve device 54 by the hydraulic pump 56.

By operating the first operational valve 49, the amount of lubricant oil fed to the operational valve device 54 is fed as work oil to the first hydraulic cylinder 45 and this oil is then discharged from the first hydraulic cylinder 45, whereby this first hydraulic cylinder 45 can be extended/contracted.

By operating the second operational valve 51, the amount of lubricant oil fed to the operational valve device 54 is fed as work oil to the left and right second hydraulic cylinders 46 and discharged from these second hydraulic cylinders 46, whereby the left and right second hydraulic cylinders 46 can be extended/contracted.

By operating the third operational valve 53, the amount of lubricant oil fed to the operational valve device 54 is fed as work oil to the left and right third hydraulic cylinders 47 and discharged from these third hydraulic cylinders 47, whereby the left and right third hydraulic cylinders 47 can be extended/contracted.

In the instant embodiment, the hydraulic circuit 40 includes an oil heating circuit 60A (an example of a "heating section"). The oil heating circuit 60A is configured such that the lubricant oil reserved in the transmission case 55 is circulated between the transmission case 55 and the traveling motor 6 and the work motor 9 by a pumping action of the hydraulic pump 56, thereby to heat the lubricant oil, i.e. the work oil of the respective hydraulic cylinder.

More particularly, the oil heating circuit 60A includes an oil feeding passage 57 configured to draw the lubricant oil reserved in the transmission case 55 by the hydraulic pump 56 and then to feed the oil to the operational valve device 54, a first oil delivering passage 61 for delivering the lubricant oil discharged from a power-beyond port 54b of the operational valve device 54 to the work motor 9, a second oil delivering passage 62 for delivering the lubricant oil discharged from the work motor 9 to the traveling motor 6, and a return oil passage 63 for returning the lubricant oil discharged from the traveling motor 6 to the transmission case 55.

In the periphery of the work motor 9, there is provided a heat exchange jacket 9a in which the lubricant oil fed from the first oil delivering passage 61 to the work motor 9 is caused to flow. The lubricant oil flowing through the inside of the heat exchange jacket 9a is heated by heat generated from the work motor 9 and then discharged to the second oil delivering passage 62.

In the periphery of the traveling motor 6, there is provided a heat exchange jacket 6a in which the lubricant oil fed from the second oil feeding passage 62 to the traveling motor 6 is caused to flow. The lubricant oil flowing through the inside of the heat exchange jacket 6a is heated by heat generated from the traveling motor 6 and then discharged to the return oil passage 63.

Incidentally, the riding grass mower machine mounts a work inverter 65 for feeding electric power of the battery 10 to the work motor 9, and a traveling inverter 66 (an example of "electric power feeding section") for feeding the electric power of the battery 10 to the traveling motor 6. FIG. 3 shows a charger 64 for charging the battery 10.

[Control Section]

Figure 4:
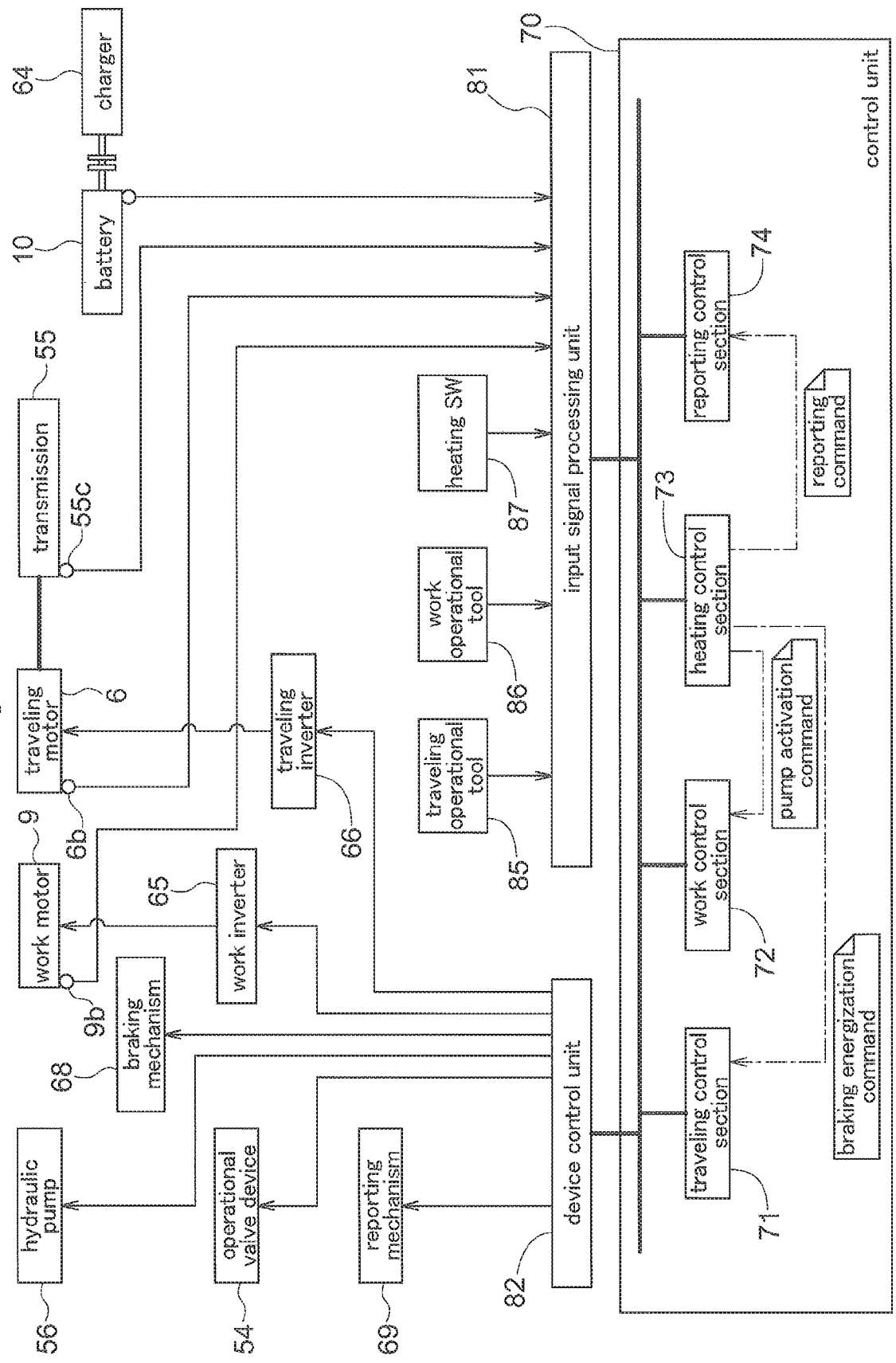
FIG. 4 is a control block diagram of the riding type grass mower machine according to the first embodiment.

In the control block diagram of FIG. 4, there is shown a control system included in this riding grass mower machine. A control unit 70 inputs various signals via an input signal processing unit 81. The control unit 70 controls operational devices by sending various control signals via a device control unit 82. Such operational devices include various devices incorporated in the riding grass mower machine exemplified by the operational valve device 54, the hydraulic pump 56, the work inverter 65, the traveling inverter 66, the braking mechanism 68, the reporting mechanism 69, etc.

The input signal processing unit 81 inputs signals from a traveling operational tool 85, a work operational tool 86, a heating switch 87 (an example of a "manual operational tool"). Further, the input signal processing unit 81 inputs also signals from various sensors and/or switches exemplified by a temperature sensor 9b that detects a temperature of the work motor 9, a temperature sensor 6b that detects a temperature of the traveling motor 6, a temperature sensor 55c that detects a temperature of the lubricant oil (work oil) inside the transmission case 55, etc. Still further, the input signal processing unit 81 inputs a signal from the battery 10 which signal indicates whether the battery 10 is being charged or not.

The traveling operational tool 85 is a generic name assigned for the devices used by a driver for operating the functional devices relating to traveling, including the steering wheel 4, an accelerator pedal 18, etc. In response to an operation on this traveling operational tool 85, a driving speed of the rear wheels 2 is adjusted. Similarly, the work operational tool 86 is a generic name assigned for the devices used by the driver for operating the functional devices relating to the utility implement, including the lift lever for the mower device 7 and the grass collecting container 11 and an operational switch of the mower device 7, etc.

The heating switch 87 is a switch operated by the driver for activating the hydraulic system 40 to carry out an oil temperature adjustment operation which will be described later.

The braking mechanism 68 connected to the device control unit 82 is a mechanism for effecting braking of the front wheels 1 and/or the rear wheels 2 and is a generic name assigned to a brake, a parking brake, etc.

The reporting mechanism 69 connected to the device control unit 82 is a mechanism for reporting various events occurring in this riding type grass mower machine and is a generic name assigned to a lamp, a buzzer, a speaker, a display, etc.

The control unit 70 includes a traveling control section 71, a work control section 72, a heating control section 73 (an example of "control section") and a reporting control section 74.

The traveling control section 71, based on a command from the traveling operational tool 85, outputs control signals for operating the traveling inverter 66 and the braking mechanism 68, via the device control unit 82.

The work control section 72, based on a command from the work operational tool 86, generates a control command to the implement and outputs to the operational valve device 54, the work inverter 65, etc. via the device control unit 82.

The heating control section 73 effects the oil temperature adjustment operation. The oil temperature adjustment operation is an operation for heating the lubricant oil (work oil) by controlling the hydraulic system 40. Details thereof will be explained later.

The heating control section 73 provides a reporting command to the reporting control section 74 based on a temperature of the lubricant oil of the transmission case 55 detected by the temperature sensor 55c. For instance, the heating control section 73 provides a reporting command to the reporting control section 74, in response to a fact of the temperature of the lubricant oil of the transmission case 55 being below a predetermined first threshold value. Based on this provided reporting command, the reporting control section 74 outputs, via the device control unit 82, a control signal for activating the reporting mechanism 69. Then, based on this control signal, the reporting mechanism 69 reports to the driver that the temperature of the lubricant oil is low.

The heating control section 73 initiates the oil temperature adjustment operation, in response to reception via the input signal processing unit 81 of a signal indicating ON operation of the heating switch 87. Specifically, the heating control section 73 provides a braking energization command to the traveling control section 71 and provides a pump activation command to the work control section 72. Then, based on the provided braking energization command, the traveling control section 71 outputs, via the device control unit 82, a control signal for activating the braking mechanism 68. With this, the braking mechanism 68 is activated and electric power is fed to the traveling motor 6 in the condition of the riding grass mower machine is stopped. Based on the pump activation command, the work control section 72 outputs, via the device control unit 82, a control signal for activating the hydraulic pump 56. With this, the lubricant oil in the transmission case 55 is caused to flow through the oil feeding passage 57, the oil delivering passage 61, the second oil feeding passage 62 and the return oil passage 63 to be heated by the traveling motor 6.

Based on a temperature of the lubricant oil of the transmission case 55 detected by the temperature sensor 55c, the heating control section 73 terminates the oil temperature adjustment operation. Specifically, in response to the temperature of the lubricant oil of the transmission case 55 having exceeded a predetermined second threshold value, the heating control section 73 provides a reporting command to the reporting control section 74 and provides a braking energization terminating command to the traveling control section 71 and provides also a pump operation terminating command to the work control section 72.

Based on the provided reporting command, the reporting control section 74 outputs, via the device control unit 82, a control signal for activating the reporting mechanism 69. Then, in response to this control signal, the reporting mechanism 69 reports to the driver that the temperature of the lubricant oil has exceeded the predetermined temperature.

Based on the provided braking energization terminating command, the traveling control section 71 outputs, via the device control unit 82, a control signal for terminating the operation of the braking mechanism 68 and outputs also, via the device control unit 82, a control signal for stopping the traveling motor 6. Based on the provided pump operation terminating command, the work control section 72 outputs, via the device control unit 82, a control signal for stopping the hydraulic pump 56.

[Modified Embodiments of First Embodiment]

(1) In the foregoing embodiment, there was disclosed an example in which the heating control section 73 initiates the oil temperature adjustment operation in response to reception of a signal indicating the heating switch 87 being ON. Alternatively, the oil temperature adjustment operation may be effected automatically, irrespectively of a driver's operation on the heating switch 87.

For instance, the heating control section 73 may effect the oil temperature adjustment operation, based on a temperature of the lubricant oil of the transmission case 55 detected by the temperature sensor 55c. For example, the heating control section 73 may effect the oil temperature adjustment operation in response to e.g. the temperature of the transmission case 55 being blow the predetermined first threshold value.

For instance, the heating control section 73 may effect the oil temperature adjustment operation in response to e.g. the temperature of the transmission case 55 being blow the predetermined first threshold value at a prescheduled use starting time (e.g. 9 AM). With this embodiment, even in a season of low temperature, an oil temperature adjustment operation will be effected automatically at the use starting time, so that the work oil fed to the hydraulic cylinder may be set to an appropriate temperature/viscosity. Namely, since the utility implement can be activated immediately at the use starting time with using the hydraulic cylinder, the convenience of the riding grass mower machine can be enhanced.

For instance, the heating control section 73 may effect the oil temperature adjustment operation during charging of the battery 10. For example, a signal indicating the battery 10 being charged will be inputted from the battery 10 and also a signal indicating the temperature of the lubricant oil of the transmission case 55 being below the predetermined first threshold value will be inputted from the temperature sensor 55c. Then, in response to these inputs, the heating control section 73 will effect the oil temperature adjustment operation.

(2) In the foregoing embodiment, there was explained an example in which the oil temperature adjustment operation is terminated in response to the temperature of the lubricant oil of the transmission case 55 having exceeded the predetermined second threshold value. Alternatively, the heating control section 73 may be arranged to terminate the oil temperature adjustment operation, in response to lapse of a predetermined period from initiation of the oil temperature adjustment operation.

(3) In the foregoing embodiment, there was explained an example in which in the oil temperature adjustment operation, the braking mechanism 68 is activated and electric power is fed to the traveling motor 6 while the riding grass mower machine is stopped and heat is generated from the traveling motor 6. Alternatively, in the oil temperature adjustment operation, the traveling inverter 66 may be controlled to supply electric power to the traveling motor 6 for generation of heat therefrom, without generation of a rotational torque therefrom. For instance, the traveling motor 6 may be controlled in such a manner as to feed electric power of such a small amount that does not cause traveling of the riding grass mower machine. In this embodiment, the oil temperature adjustment operation can be effected while the riding grass mower machine is stopped, without need to activate the braking mechanism 68.

Second Embodiment

A further embodiment as another example of the present invention will be explained with reference to the accompanying drawings. In the following discussion, explanation of same or similar arrangements as/to those of the foregoing embodiment may be omitted with provision of same/like reference signs.

In this embodiment, the oil heating circuit 60A of the hydraulic circuit 40 is arranged to function as an oil cooling circuit 160A (an example of a "cooling section") for cooling the traveling motor 6 and the work motor 9. This oil cooling circuit 160A is configured to cool the traveling motor 6 and the work motor 9 by circulating the lubricant oil reserved in the transmission case 55 between this transmission case 55 and the traveling motor 6 and the work motor 9 by a pumping action of the hydraulic pump 56.

Specifically, the oil cooling circuit 160A includes an oil feeding passage 57 for drawing out the lubricant oil reserved in the transmission case 55 and feeding this to the operational valve device 54, a first oil delivering passage 61 for feeding the lubricant oil discharged from the power-beyond port 54b of the operational valve device 54 to the work motor 9, a second oil delivering passage 62 for feeding the lubricant oil discharged from the work motor 9 after cooling this work motor 9 to the traveling motor 6, and a return oil passage 63 for returning the lubricant oil discharged from the traveling motor 6 after cooling this traveling motor 6 to the transmission case 55.

In the periphery of the work motor 9, there is provided the heat exchange jacket 9a in which the lubricant oil fed from the first oil delivering passage 61 to the work motor 9 is caused to flow. The lubricant oil flowing through the inside of the heat exchange jacket 9a cools the work motor 9 and then is discharged to the second oil delivering passage 62.

In the periphery of the traveling motor 6, there is provided the heat exchange jacket 6a in which the lubricant oil fed from the second oil delivering passage 62 to the traveling motor 6 is caused to flow. The lubricant oil flowing through the inside of the heat exchange jacket 6a cools the traveling motor 6 and then is discharged to the return oil passage 63.

Figure 5:
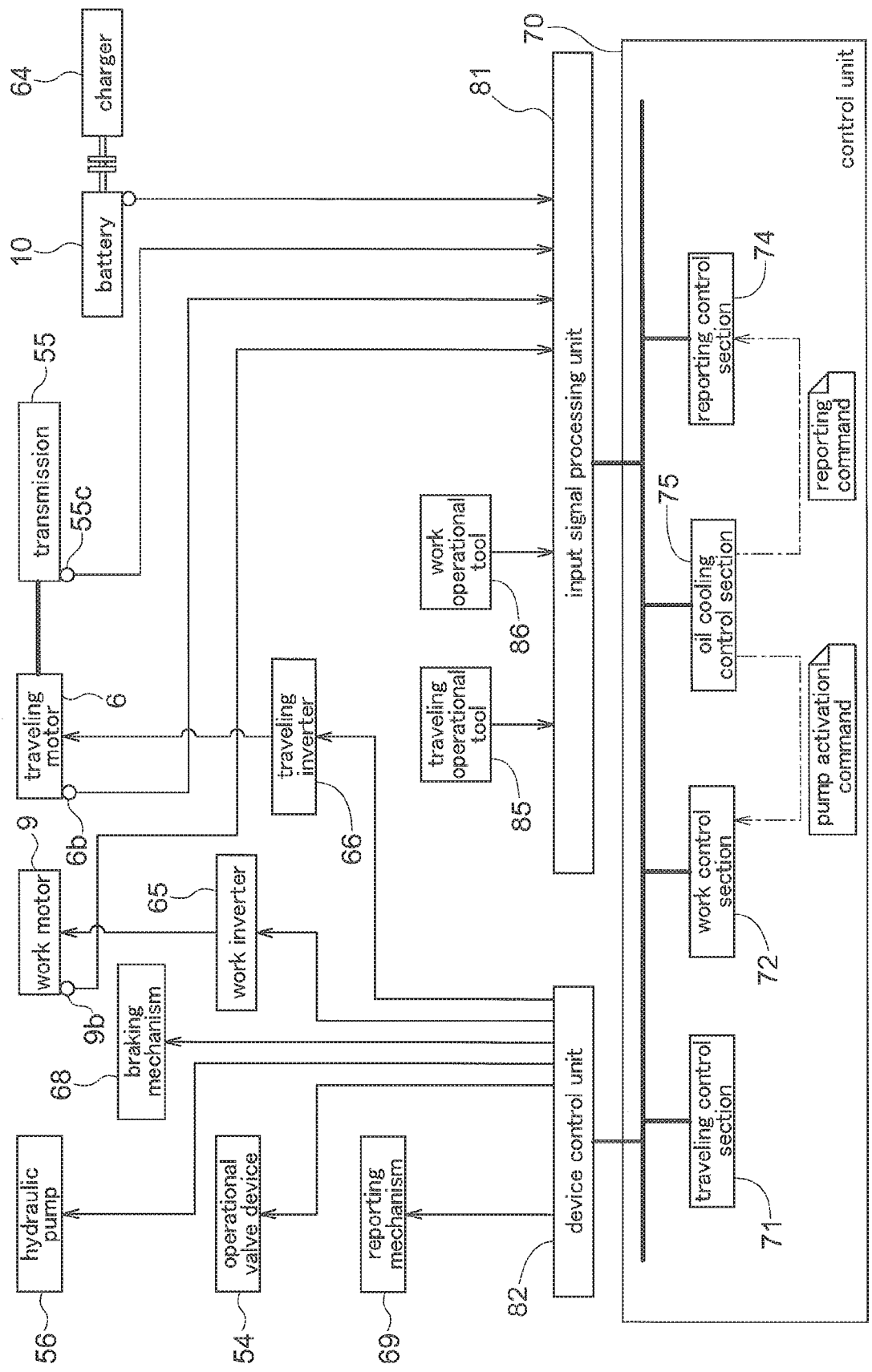
FIG. 5 is a control block diagram of a riding type grass mower machine according to a second embodiment.

The control block diagram of FIG. 5 shows a control system provided in the riding grass mower machine of this embodiment.

A control unit 70 includes the traveling control section 71, the work control section 72, the reporting control section 74 and an oil cooling control section 75 (an example of the "control section").

The oil cooling control section 75 effects an oil cooling operation. This oil cooling operation is an operation of cooling the traveling motor 6 and the work motor 9 by controlling the hydraulic system 40.

The oil cooling control section 75 effects the oil cooling operation, based on a temperature of the traveling motor 6 detected by the temperature sensor 6b and a temperature of the work motor 9 detected by the temperature sensor 9b. For instance, in response to at least one of the temperature of the traveling motor 6 and the temperature of the work motor 9 having exceeded a predetermined third threshold value, the oil cooling control section 75 provides a reporting command to the reporting control section 74 and provides a pump activation command to the work control section 72.

Based on the provided reporting command, the reporting control section 74 outputs, via the device control unit 82, a control signal for activating the reporting mechanism 69. Then, based on this control signal provided thereto, the reporting mechanism 69 reports to the driver that either one of or both of the temperature of the traveling motor 6 and the temperature of the work motor 9 is/are high.

Based on the provided pump activation command, the work control section 72 outputs, via the device control unit 82, a control signal for activating the hydraulic pump 56. With this, the lubricant oil of the transmission case 55 is caused to flow through the oil feeding passage 57, the first oil delivering passage 61, the second oil delivering passage 62 and the return oil passage 63, whereby the traveling motor 6 and the work motor 9 are cooled.

And, in response to either one of or both of the temperature of the traveling motor 6 and the temperature of the work motor 9 having dropped below a predetermined fourth threshold value, the oil cooling control section 75 provides a reporting command to the reporting control section 74 and provides a pump activation terminating command to the work control section 72.

Based on the provided reporting command, the reporting control section 74 outputs, via the device control unit 82, a control signal for activating the reporting mechanism 69. Then, based on this control signal, the reporting mechanism 69 reports to the driver that either one of or both of the temperature of the traveling motor 6 and the temperature of the work motor 9 has/have returned to normal.

[Modified Embodiments of Second Embodiment]

(1) In the oil cooling operation, the output (oil delivery amount) of the hydraulic pump 56 (or the hydraulic pump 92) may be controlled based on the temperature of the traveling motor 6 (or the work motor 9). For instance, the oil cooling control section 75 may be arranged such that the higher the temperature of the traveling motor 6, the higher the output of the hydraulic pump 56.

(2) In the oil cooling operation, the work control section 72 may be arranged such that the output of the hydraulic pump 56 which is being operated with feeding of work oil to at least one of the first hydraulic cylinder 45, the second hydraulic cylinders 46 and the third hydraulic cylinders 47 may be higher than the output there of at the time of non-activated states of these hydraulic cylinders.

Figure 6:
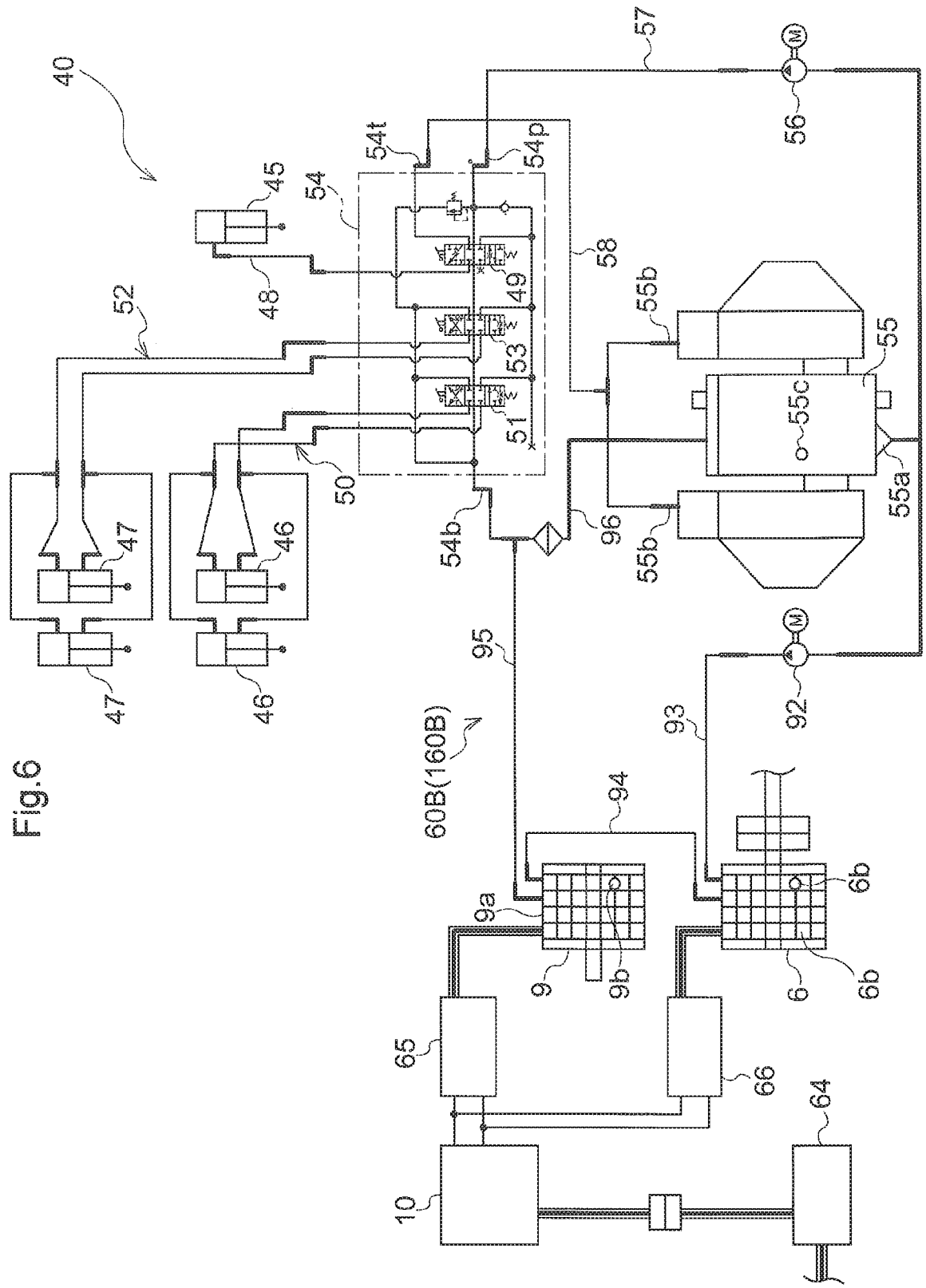
FIG. 6 is a circuit diagram showing a hydraulic system of a riding type grass mower machine according to a further embodiment.

Other Embodiments (1) FIG. 6 is a circuit diagram showing a hydraulic circuit 40 having a oil heating circuit 60B (an example of the "heating section") different from the oil heating circuit 60A used in the foregoing embodiment. This oil heating circuit 60B includes an oil feeding passage 93 drawing the lubricant oil of the transmission case 55 by the hydraulic pump 92 and then feeding it to the traveling motor 6, an oil delivering passage 94 for feeding the lubricant oil discharged from the traveling motor 6 to the work motor 9 and a return oil passage 95 for returning the lubricant oil discharged from the work motor 9 to the transmission case 55. The return oil passage 95 is connected to an oil discharge passage 96 for returning the lubricant oil (work oil) discharged from the power-beyond port 54b of the operational valve device 54 to the transmission case 55.

In this embodiment, in the oil temperature adjustment operation, the work control section 72 outputs, via the device control unit 82, a control signal for activating the hydraulic pump 92 based on a pump activation command provided from the heating control section 73. With this, the lubricant oil of the transmission case 55 is caused to flow through the oil delivering passage 93, the oil delivering passage 94 and the return oil passage 95 of the oil heating circuit 60B to be heated by the traveling motor 6 and the work motor 9.

Incidentally, the oil heating circuit 60B can alternatively function as the oil cooling circuit 160B for cooling the traveling motor 6 and the work motor 9. In such case, based on the pump activation command provided from the oil cooling control section 75, the work control section 72 will output, via the device control unit 82, a control signal for activating the hydraulic pump 92. With this, the lubricant oil of the transmission case 55 will be caused to flow through the oil delivering passage 93, the oil delivering passage 94 and the return oil passage 95 of the hydraulic circuit 160B, whereby the traveling motor 6 and the work motor 9 are cooled.

(2) In the foregoing embodiment, there was disclosed an example in which the front wheels 1 and the rear wheels 2 are provided. Instead, a crawler traveling device or a semi-crawler traveling device may be provided.

(3) In the foregoing embodiment, there was explained an example in which the riding grass mower machine is provided with the first hydraulic cylinder 45, the second hydraulic cylinders 46 and the third hydraulic cylinders 47. Instead, the riding grass mower machine may be provided with a power-steering hydraulic cylinder (an example of the "hydraulic cylinder") for assisting the steering operation of the front wheels 1 by the steering wheel 4. Further alternatively, the riding grass mower machine may be provided with a front loader and a loader hydraulic cylinder (an example of the "hydraulic cylinder") for lifting up/down such front loader.

INDUSTRIAL APPLICABILITY

The present invention is applicable to an electric work vehicle having a hydraulic cylinder and an electric motor. Namely, the invention is applicable not only to the riding grass mower machine, but also to a tractor, a transporter vehicle, a paddy rice field work machine, etc.

DESCRIPTION OF SIGNS

6: traveling motor (electric motor)
6b: temperature sensor
9: work motor (electric motor)
9b: temperature sensor
10: battery 40: hydraulic system (work oil feeding section)
45: first hydraulic cylinder (hydraulic cylinder)
46: second hydraulic cylinder (hydraulic cylinder)
47: third hydraulic cylinder (hydraulic cylinder)
55c: temperature sensor
60A: oil heating section (heating section)
60B: oil heating circuit (heating section)
66: traveling inverter (power feeding section)
68: braking mechanism
69: reporting mechanism
73: heating control section (control section)
75: oil cooling control section (control section)
87: heating switch (manual operational tool)
160A: oil cooling circuit (cooling section)
160B: oil cooling circuit (cooling section)

The invention claimed is:

1. An electric work vehicle comprising:
   a hydraulic cylinder;
   a work oil feeding section for feeding work oil to the hydraulic cylinder;
   an electric motor; and
   a control section,
   wherein the work oil feeding section includes a heating section for heating the work oil with using heat generated from the electric motor, and
   wherein the control section effects an oil temperature adjustment operation for heating the work oil by controlling the work oil feeding section, and the control section effects the oil temperature adjustment operation in response to an operation received by a manual operation tool.

2. The electric work vehicle of claim 1, further comprising:
   a control section for effecting an oil temperature adjustment operation for heating the work oil by controlling the work oil feeding section, the control section effecting the oil temperature adjustment operation in accordance with a temperature of the work oil detected by a temperature sensor.

3. The electric work vehicle of claim 2, further comprising:
   a reporting mechanism that effects reporting in accordance with a temperature of the work oil detected by the temperature sensor.

4. The electric work vehicle of claim 1, further comprising:
   a control section for effecting an oil temperature adjustment operation for heating the work oil by controlling the work oil feeding section;
   a battery for feeding electric power to the electric motor; and
   the control section effecting the oil temperature adjustment operation during charging of the battery.

5. The electric work vehicle of claim 1, further comprising:
   a work motor for driving an implement as the electric motor.

6. The electric work vehicle of claim 1, further comprising:
   a control section for effecting an oil temperature adjustment operation for heating the work oil by controlling the work oil feeding section;
   a traveling motor for driving a traveling device as the electric motor;
   a power feeding section for feeding electric power to the traveling motor; and
   the control section causing the power feeding section to feed electric power to the traveling motor when the oil temperature adjustment operation is effected.

7. The electric work vehicle of claim 6, further comprising:
   a braking mechanism to brake the traveling device, the control section causing the power feeding section to feed electric power to the traveling motor with keeping an operation of the braking mechanism, when the oil temperature adjustment operation is effected.

8. An electric work vehicle comprising:
   a hydraulic cylinder;
   a work oil feeding section for feeding work oil to the hydraulic cylinder;
   an electric motor;
   a cooling section for cooling the electric motor by using the work oil fed from the work oil feeding section; and
   a control section for controlling the work oil feeding section,
   wherein the work oil feeding section has a pump for pumping out the work oil to the cooling section, and
   wherein the control section controls the pump in accordance with a temperature of the electric motor detected by a temperature sensor.

9. The electric work vehicle of claim 8, wherein a traveling motor for driving a traveling device is provided as the electric motor.

10. The electric work vehicle of claim 8, wherein a work motor for driving an implement is provided as the electric motor.

* * * * *